United States Patent Office 3,496,339
Patented Feb. 17, 1970

3,496,339
ELECTRICAL HEATING SYSTEMS
Donald Portas, Nuneaton, and Charles Aneurin Davies, Kenilworth, England, assignors to The Dunlop Company Limited, Birmingham, England, a corporation of Great Britain
Filed Apr. 12, 1967, Ser. No. 630,450
Claims priority, application Great Britain, Apr. 23, 1966, 17,856/66, 17,857/66
Int. Cl. H05b 1/02
U.S. Cl. 219—501     12 Claims

ABSTRACT OF THE DISCLOSURE

A control system, for an electrical heating system comprising a heating element having a resistance which varies with temperature, comprising means including at least one silicon controlled rectifier for feeding electrical power to the heating element from an alternating current supply, means for sensing a change in the resistance of the element, and control means responsive to said change in resistance and arranged to reduce the electrical power supplied to the heating element to prevent the temperature of the heating element from rising above a predetermined level.

---

This invention relates to electrical heating systems, and particularly, but not exclusively, to control systems for electrical heating systems for aircraft de-icing.

In the operation of an aircraft de-icing system, it is desirable for maximum de-icing efficiency to raise the heating elements to as high a temperature as possible without damaging the heating elements and their supporting structure.

One object of the present invention is to provide a control system for an electrical heating system for use in aircraft de-icing.

According to the invention, a control system, for an electrical heating system comprising a heating element having a resistance which varies with temperature, comprises means including at least one silicon controlled rectifier for feeding electrical power to the heating element from an alternating current supply, means for sensing a change in the resistance of the element, and control means responsive to said change in resistance and arranged to reduce the electrical power supplied to the heating element to prevent the temperature of the heating element from rising above a predetermined level.

The invention also provides an electrical heating system comprising a heating element having a resistance which varies with temperature, and a control system comprising means including at least one silicon controlled rectifier for feeding electrical power to the heating element from an alternating current supply, means for sensing a change in the resistance of the element, and control means responsive to the sensing means and arranged to reduce the electrical power supplied to the heating element to prevent the temperature of the heating element from rising above a predetermined level.

The means for continuously feeding electrical power to the heating element, including at least one silicon controlled rectifier (to be referred to as an "SCR") connected to an alternating current supply phase may be arranged to be triggered from a control amplifier which renders the SCR conducting for a proportion only of each half-cycle of the alternating supply. An alternative manner in which the power supplied to the heating element can be controlled is by preventing the SCR's from triggering for a time interval after the heating element reaches a predetermined temperature.

In one system according to the invention the means for sensing a change in the resistance of the element comprises a transformer having a core and two primary windings connected to produce opposing magnetic effects in the core, and a secondary winding which is connected to operate the control amplifier. One primary winding is connected in series with the heating element to form a "current winding" and the other primary winding is connected in parallel with the heating element to form a "voltage winding." The voltage induced in the secondary winding is proportional to the difference between the products of the respective currents and numbers of turns in the two primary windings, and the numbers of turns in these windings are chosen so that when the heater resistance is of a predetermined value, corresponding to a desired value of the temperature of the heater element, the magnetic effects of the primary windings cancel one another. When the temperature of the heater element differs from the desired value its resistance will have a different value, and a signal will be produced in the secondary winding proportional to the change in resistance. The phase of the secondary output will change as the resistance rises through the value at which the magnetic effects of the primary windings cancel one another.

In an alternative temperature responsive heating system the heating element comprises a control resistance section in series with the remaining section or sections of the heating element and having a different coefficient of change of resistance with temperature relative to the remaining section or sections.

Various embodiments of the invention will now be described, with reference to the accompanying drawings, in which.

Figure 1:
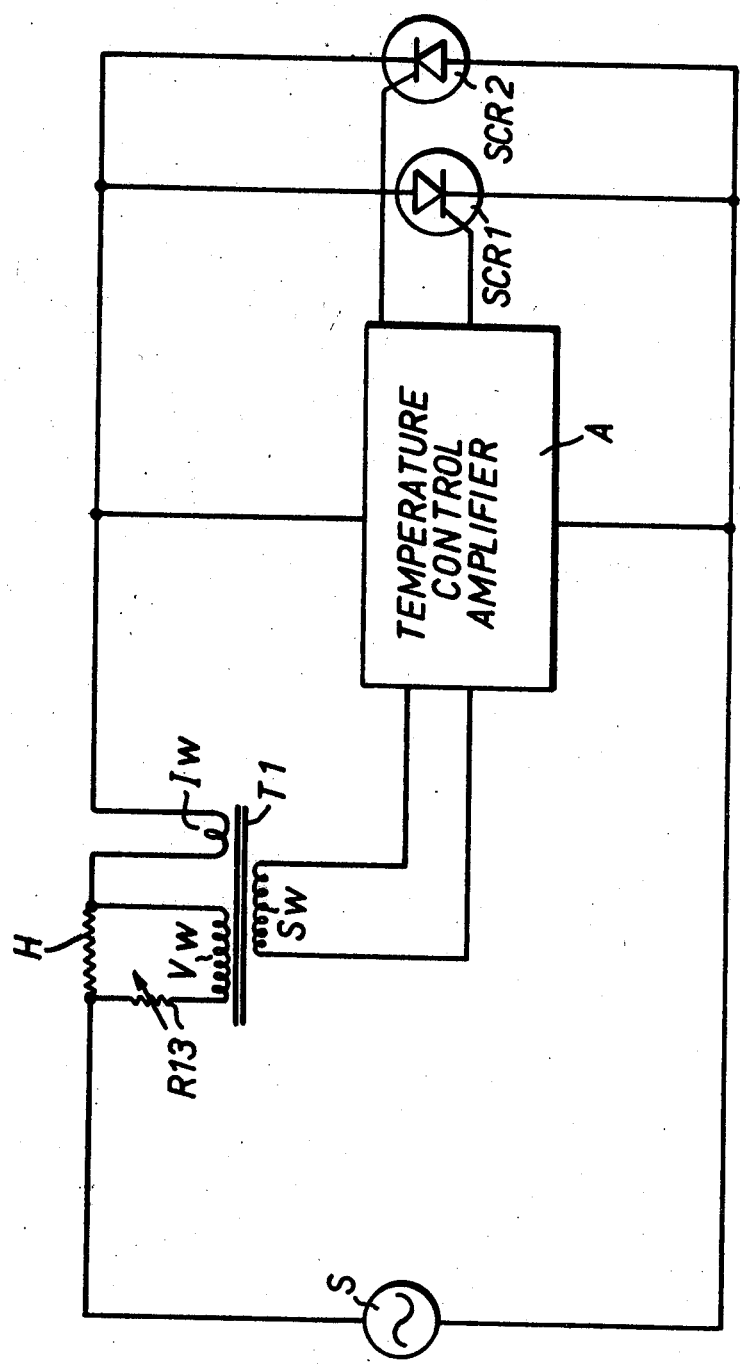
FIGURE 1 is a block schematic diagram showing the electrical circuit for an aircraft de-icing system.
Figure 2:
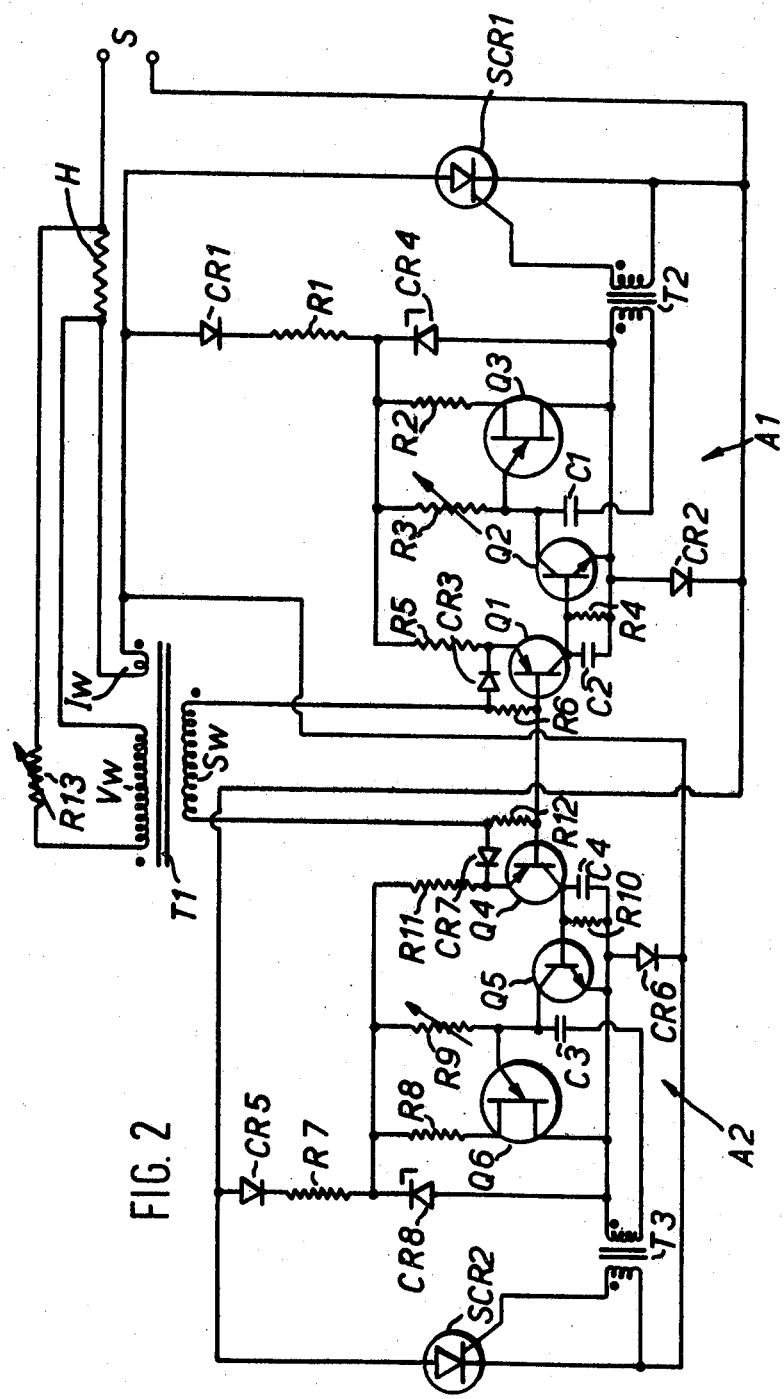
FIGURE 2 is a more detailed circuit diagram for the system shown in FIGURE 1.

The system shown in FIGURES 1 and 2 comprises an electrical heater element arranged to be supplied with electrical power from an alternating current supply. The supply to the heater element passes through a pair of silicon controlled rectifiers SCR1 and SCR2 arranged to be triggered by a control amplifier A (see FIGURE 1) which sets the firing angle of the silicon controlled rectifiers so that each SCR only passes current for part of each half-cycle of the AC supply during which the applied supply voltage is in the appropriate direction for passage of current through the SCR.

The control amplifier A is controlled in turn by a control transformer T1 which senses any change in the resistance of the heater element H relative to a predetermined value corresponding to a desired value of the temperature of the heater element.

The control transformer T1 comprises a core on which are wound two primary windings $I_w$ and $V_w$ and a secondary winding $S_w$. The "voltage winding" $V_w$ is connected in parallel with the heater element and is provided with a calibration resistance R13, and the "current winding" $I_w$ is connected in series with the heater element H. The numbers of turns of the windings $V_w$ and $I_w$ and the resistance R13 are arranged so that when alternating current is passed through the heater element and the heater element is at a desired temperature, the magnetic effects of the two windings $V_w$ and $I_w$ cancel one another and no voltage is developed in the secondary winding $S_w$.

When the temperature of the heater element is below the desired value the voltage developed in the secondary winding is ineffective to operate the control amplifier, but when the temperature of the heater element rises through the desired value the voltage developed in the secondary winding $S_w$ is reversed in phase and provides a signal, proportional to the temperature excess, which operates the control amplifier A so as to reduce the power supplied to the heater.

The control amplifier A is arranged as follows (see FIGURE 2):

The two ends of the winding $S_w$ are connected to the input stages of two separate control amplifier circuit portions A1 and A2 which are arranged respectively to control the firing angles of SCR1 and SCR2. The circuit portions associated with SCR1 and SCR2 are identical, and only the portion associated with SCR1 will be described.

SCR1 is connected in series with the heater element H and the alternating current supply S, and is triggered by a circuit including a unijunction transistor Q3 which is supplied with power through a rectifier CR1, the potential applied to Q3 being limited by a Zener diode CR4.

The emitter of the transistor Q3 is connected to a capacitor C1 which, in each half-cycle of the supply which is of the correct polarity to pass through the rectifier CR1, is charged through a variable resistance R3 at a rate determined by the impedance presented by a transistor Q2 in in parallel with the capacitor C1. The capacitor C1 is connected, through the emitter of unijunction transistor Q3, across the primary winding of a transformer T2 the secondary of which is connected to the triggering electrode or gate of SCR1. The arrangement of the transistors Q2 and Q3, transformer T2 and capacitor C1 is such that the potential across C1 will, in each supply half-cycle of appropriate polarity, reach the level at which Q3 fires at a time in the half-cycle which is determined by the rate at which C1 is allowed by transistor Q2 to charge. When Q3 fires, it triggers SCR1 to allow full current to flow to the heater element H during the remainder of the half-cycle.

The impedance of Q2 depends on its base current which is derived from a capacitor C2 which receives current pulses from an amplifying transistor Q1 which forms part of a phase-sensitive gate circuit. The emitter of the transistor Q1 is connected through R5 to the supply, and through rectifier CR3 to one end of the control transformer secondary winding $S_w$ so that the current through Q1 is controlled by the voltage induced in $S_w$ and developed across resistance R6 to feed current through the emitter-base circuit of Q1. The windings $I_w$ and $V_w$ of the control transformer T, are arranged so that the voltage developed in $S_w$ when the temperature, and consequently the resistance, of the heater element is below the predetermined required level, is 180 degrees out of phase with the supply voltage. This voltage has no effect on the transistor Q1, since there is no emitter-base current at the instant when the supply voltage is present at the emitter. When the temperature of the heater element rises above the predetermined level, the voltage developed in $S_w$ is reversed in phase and increases proportionately to the amount by which the temperature of the heater element exceeds the predetermined required level. This produces a current in the emitter-base circuit of Q1 which causes a pulse of current of increased magnitude to be fed through Q1 in each half-cycle of appropriate polarity to charge capacitor C2. A resistor R4 connected across C2 is sufficiently large to ensure that a sufficient proportion of the voltage developed across C2 during one half-cycle is still present at the beginning of the next half-cycle of appropriate polarity so as to cause capacitor C1 to commence charging at approximately the correct rate.

In operation, when the temperature of the heater element is below the desired value SCR1 and SCR2 are triggered almost instantaneously at the beginning of their appropriate half-cycles. In the circuit associated with SCR1 a small current flows at the beginning of the half-cycle from one side of the supply through CR1, R1, R3, to charge C1, the circuit being completed by T2 and CR2 to the other side of the supply, until the potential across C1 reaches the point where Q3 fires. The time at which Q3 fires is determined by the charging rate of C1, which is determined by the impedance Q2, which is of a high value when the temperature of the heater element is low, and C1 therefore discharges through Q3 almost instantaneously to trigger SCR1 and thus to allow the full current to flow through the heater element for most of the half-cycle. Similarly, in the next half-cycle current flows through the circuit associated with SCR2 to trigger SCR2 almost instantaneously.

When the temperature of the heater element rises above the predetermined required value, the current fed into the amplifier transistor Q1 is in phase with the supply current, and causes current to flow through Q1 so as to build up the charge on C2, thus lowering the effective impedance of Q2 and causing the charging rate of C1 to be reduced. This delays the firing of Q3 and SCR1 until a later time in the half-cycle and thus effectively reduces the power supplied to the heater element. A similar process takes place during alternate half-cycles in the circuit associated with SCR2.

Figure 3:
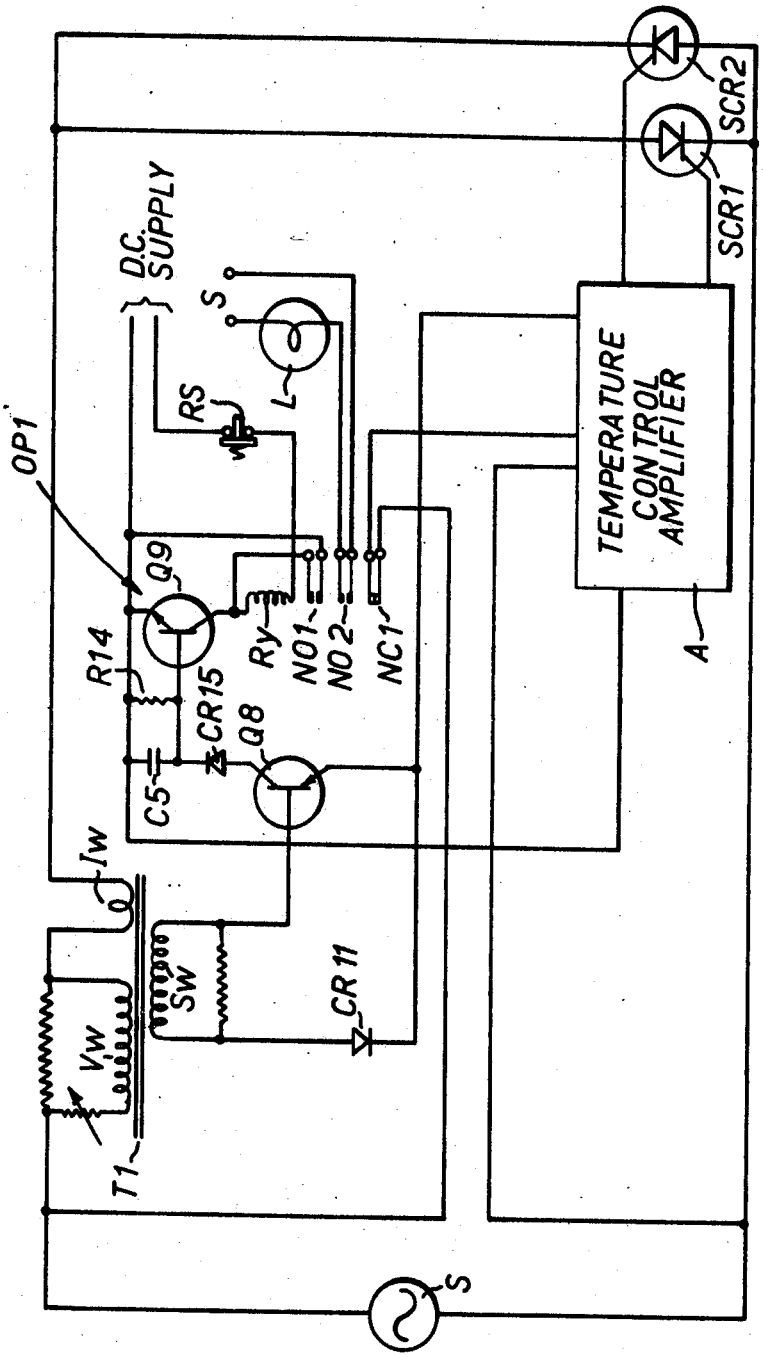
FIGURE 3 is a block schematic diagram showing an overheat protection circuit.

The overheat protection circuit OP1 shown in FIGURE 3 may be incorporated in a system of the general form shown in FIGURES 1 and 2 to prevent an undue rise in temperature in the event of a failure in the temperature control system. It comprises a relay Ry having normally closed contacts NC1 in series with the power supply to the temperature control amplifier A.

The solenoid of relay Ry is connected in series with the collector of a transistor Q9 which forms part of a phase-sensitive gate circuit including a transistor Q8, rectifier CR15, capacitor C5 and resistor R14. The phase-sensitive gate circuit is of similar form and function to the corresponding circuit including transistors Q1 and Q2 of the circuit shown in FIGURE 2, and is arranged to receive a signal from the output winding $S_w$ of a control transformer e.g. T1 through rectifier CR11 whenever the temperature of the heater element differs from the required value. When the phase change occurs as the temperature rises through the required value, and reaches a predetermined maximum level, the overheat control circuit operates the relay to disconnect the power supply from the temperature control amplifier A. The relay is then held closed by a pair of hold-on contacts No. 1 even though the temperature of the heater element falls below the maximum level, until the relay is manually re-set by a switch Rs arranged to interrupt its electrical supply. A warning light L, operated by contacts No. 2 is provided to indicate when the relay Ry has operated to cut off the heater power.

Figure 4:
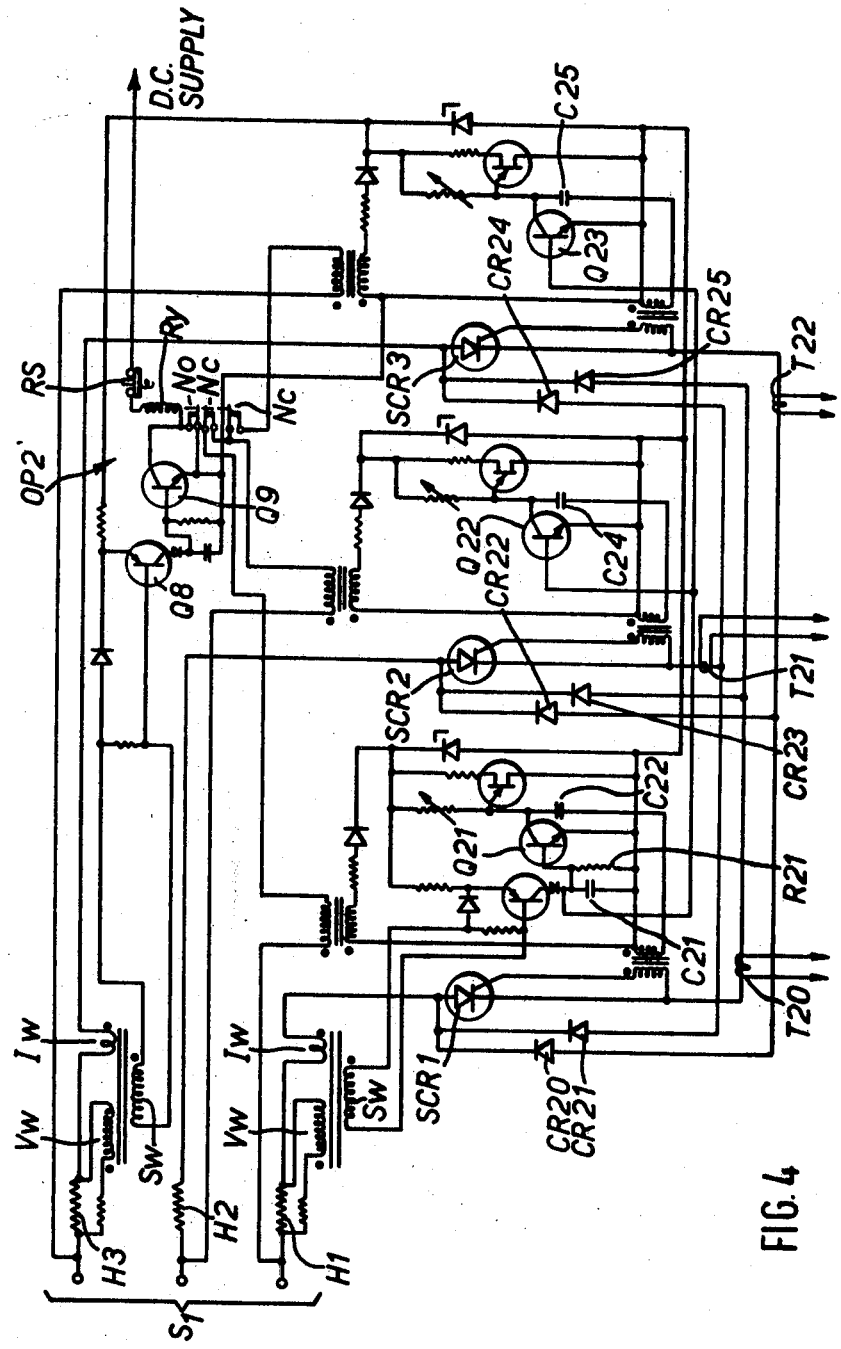
FIGURE 4 is a circuit diagram for a further alternative aircraft de-icing system.

In the modified system shown in FIGURE 4, three heater elements are connected in star formation in a 3-phase power supply circuit S1. The supplies to the three elements are controlled by three silicon controlled rectifiers SCR1, SCR2 and SCR3 which are each connected in series with their respective heater elements H1, H2, H3 to control the flow of current through the respective elements in one direction only. In order to permit reverse current to flow past each SCR when the phase relationship of the supplies to the associated elements and one or both of the other elements is such as to require such a reverse flow, each SCR is by-passed by a pair of rectifiers CR20, 21; CR22, 23; CR24, 25 connected one to each of the other SCR's. As shown in FIGURE 4, SCR1 is by-passed for reverse flow by rectifiers CR20 and CR21, connected respectively to the cathodes of SCR3 and SCR2. Currents can therefore flow from the respective phase terminals through the heater elements associated with SCR3 and SCR2, then through SCR3 and SCR2, then through CR20 and CR21 to the heater element and phase terminal associated with SCR1.

The control circuit of SCR1 is similar to that shown in FIGURE 2, but is also arranged to supply a controlling potential to set the firing angles, in their respective phases, of the control circuits of SCR2 and SCR3. The controlling potential is taken from the junction of C21 and R21 (FIGURE 4) and applied to the base terminals of transistors Q21, Q22 and Q23 which control the charging rates of C22, C24, C25 to determine the firing angles of SCR1, SCR2 and SCR3, the manner of operation of the three control circuits in FIGURE 4 being similar to that of the circuits shown in FIGURE 2. The time constant C21, R21 is sufficiently long to provide substantially equal potentials for setting the firing angle in each phase, despite the time intervals elapsing between the current flows in the respective phases.

It may be desirable to use the control systems shown in FIGURE 2 or FIGURE 4 to control the supply of power to one or more other heater elements or groups of heater elements supplied from the same alternating current source. This may be achieved, as shown in FIGURE 4, by the use of transformers T20, T21, T22 which each pass a triggering supply at the appropriate instant to an SCR associated with another heater element, and having rectifiers corresponding to CR20–CR25.

FIGURE 4 also shows an overheat protection circuit OP2 substantially as described above with reference to FIGURE 3.

Figure 5:
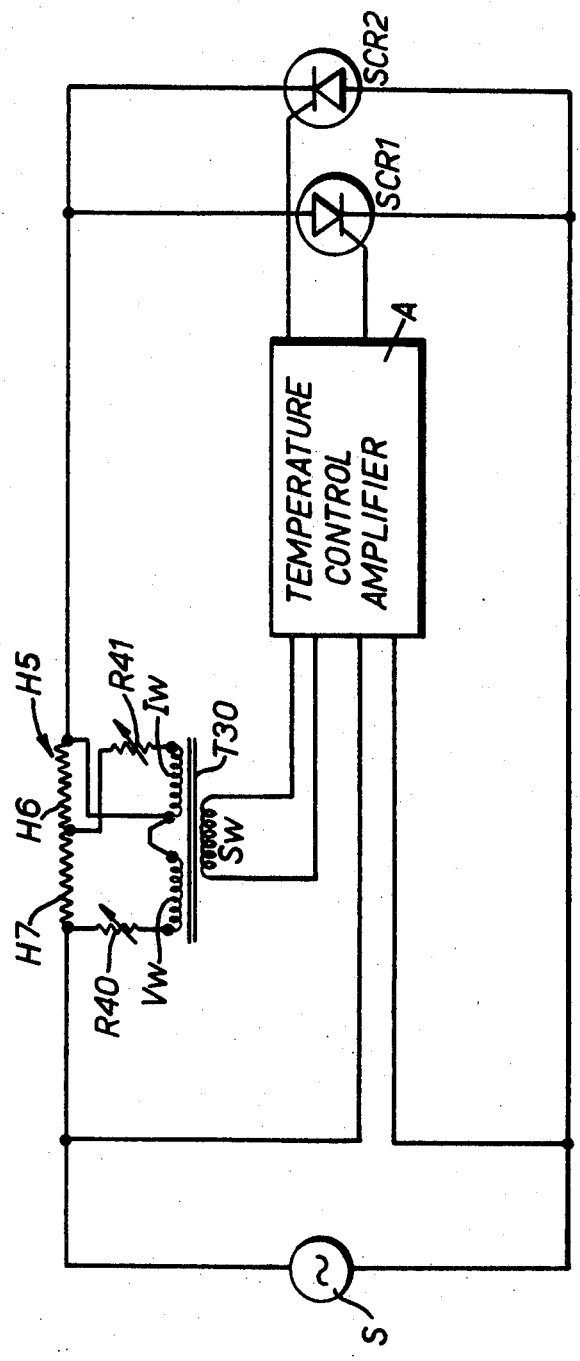
FIGURE 5 is a block schematic diagram showing a further alternative aircraft de-icing system.
Figure 6:
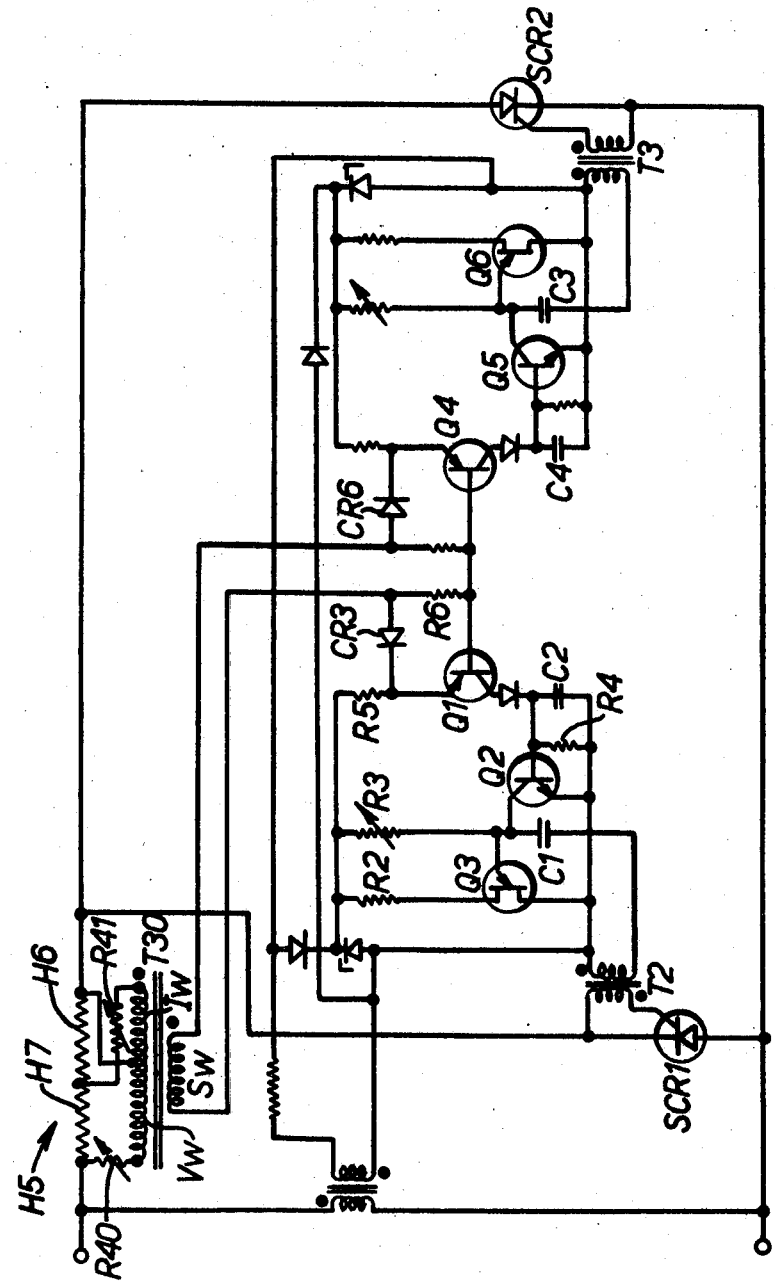
FIGURE 6 is a circuit diagram for the system shown in FIGURE 5.

FIGURES 5 and 6 show a system which has a different temperature sensing system from that of the systems described above.

In this system the heater element H5 is divided into two series-connected sections H6 and H7 having different coefficients of change of resistance with temperature: a control resistance section H6 which has a fairly high temperature coefficient, and a remaining section H7 which has a fairly constant resistance as the temperature changes.

A control transformer T30 comprises a pair of primary windings V$w$ and I$w$ and a secondary winding S$w$. V$w$ constitutes a supply voltage sensing coil and is connected across the whole of the heater element H5; I$w$ constitutes a control voltage sensing coil and is connected across the control resistance section H6. The windings are connected so as to produce opposing magnetic effects in the core, and a pair of control point adjustment resistors R40 and R41 are adjusted so that the effects of the coils I$w$ and V$w$ cancel one another when the voltage across the control resistance section H6 has a value corresponding to the required temperature of the heater.

The mode of operation of the system shown in FIGURES 5 and 6 is a similar to that of the system shown in FIGURES 1 and 2.

In an alternative arrangement (not illustrated) where a divided heating element as shown in FIGURE 5 is employed, the two sections of the heating element may be incorporated in a bridge circuit of conventional design to provide a signal for operating the temperature control amplifier.

Figure 7:
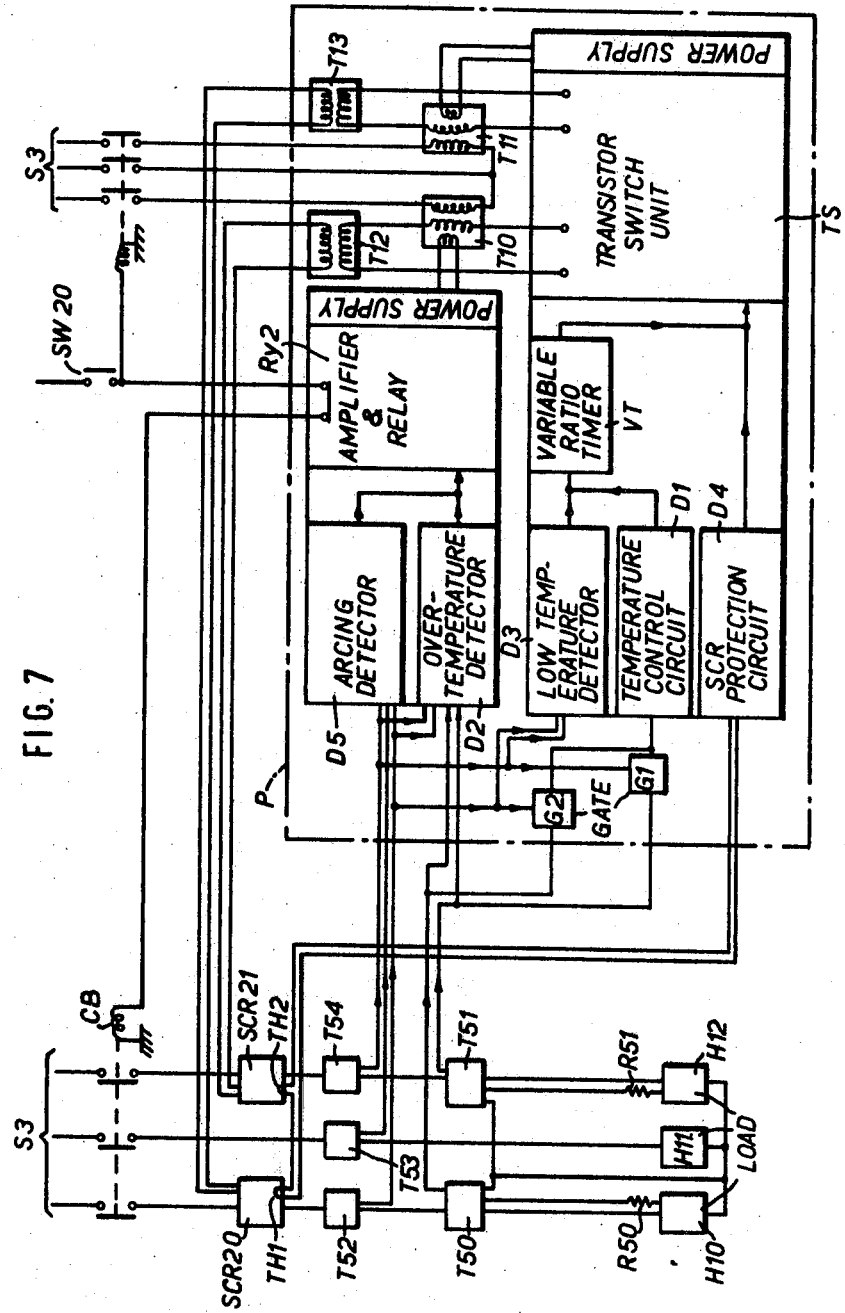
FIGURE 7 is a block schematic diagram showing a further alternative aircraft de-icing system.

FIGURE 7 illustrates an alternative aircraft de-icing system which incorporates a number of additional features to those of the systems described above.

The system shown in FIGURE 7 is energized by a three phase supply S3 which is connected to three heater elements H10, H11, H12. The phases connected to the elements H10 and H12 are controlled by two pairs SCR20 and SCR21 of silicon controlled rectifiers which are themselves controlled by a temperature control circuit to be described, but the phase conected to the element H11 does not need to pass through an additional SCR since it is effectively controlled by SCR20 and SCR21, through which its current supply must pass.

The action of the SCR's is controlled by a set of control circuits P which are actuated by control transformers T50 and T51 and by current transformers T52, T53 and T54 which are arranged to supply signals in phase with the currents flowing in the three-phase supply lines S3.

The signals from the control transformers T50 and T51 are generated in the same manner as in the circuits shown in FIGURES 1 and 2, and are fed into the control circuits P through a pair of gates G1 and G2 which are also fed with AC signals from current transformers T52 and T54 respectively. As in the circuits previously described, when the temperature of the heater elements rises above a predetermined level, the phase of the signals from transformers T50 and T51 becomes the same as that of the signals from T52 and T54 respectively, and a signal is then passed to the normal temperature control circuit D1, which forms part of a temperature sensing circuit.

A second temperature control circuit D2 comprises a similar pair of gates to the gates G1 and G2, except that a bias voltage is applied to the gates to ensure that the over-temperature detector D2 only comes into operation when the temperature of the heater exceeds the desired level by more than a predetermined amount. The operation of this circuit will be described later.

Figure 8:
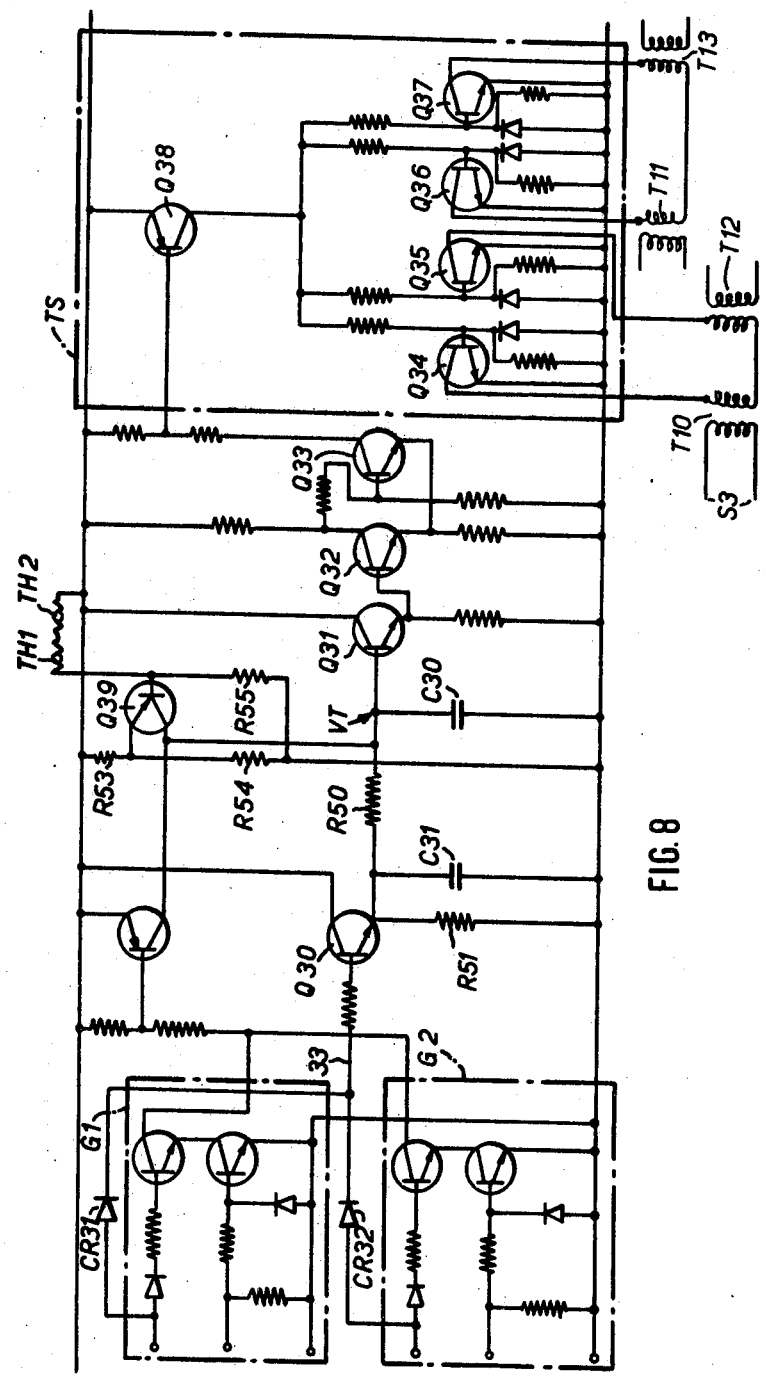
FIGURES 8 and 9 are circuit diagrams for parts of the system shown in FIGURE 7.

The normal temperature control detector D1 produces a series of unidirectional pulses which are fed to a timer capacitor C30 contained in a variable-ratio timer circuit VT. The amplitude of the pulses issuing from the temperature control detector D1 is proportional to the excess of the temperature of the heater over the required level, and thus the time taken to charge the capacitor C30 (see FIGURE 8) in the variable-ratio timer VT to a predetermined voltage level will depend upon this excess temperature. When a predetermined voltage level is reached, the capacitor discharges through a trigger circuit Q31, Q32, Q33 and produces an output pulse which is then passed to a transistor switch unit TS. The transistor switch unit comprises pairs of switching transistors Q34, Q35; Q36, Q37 actuated by a control switching transistor Q38 and is operated by the pulse for a period which is set by the rate of discharge of the capacitor C30 through resistors R50 and R51, and thus operates to switch off the heater supplies for a predetermined time in the following manner:

The transistor switch unit TS is arranged to supply current through a transformer system T10, T11 and T12, T13 to the control elements associated with the SCR's, and when the output pulse from the variable-ratio timer is received the transistor switch unit operates to cut off the voltage supply to the SCR control circuits and thus to prevent current from flowing to the heater elements. When the output pulse from the variable-ratio timer ceases, following the predetermined time interval referred to above, the transistor switch unit operates to reconnect the voltage supply to the SCR control elements and thus to restore the flow of power to the heaters.

One effect of the arrangement described above is that if one heater element H10 or H12 becomes "open-circuit," the false signals which would otherwise be transmitted to the temperature control circuit D1 is blocked by the appropriate gate G1 or G2, since there would be no phase correspondence between the signals from the transformer T52 or T54 and the transformers T50 or T51 respectively.

The over-temperature detector D2 feeds an amplifier connected to operate a relay which is arranged to operate so as to cut off the main power supply to the system whenever an excessive temperature increase occurs. This amplifier and cut-out relay is indicated by reference R$y$2. The cut-out relay is arranged in series with a main circuit breaker CB and a reset control SW20. The normally closed contacts of the relay Ry2 can be reclosed by operating the reset switch SW20 which cuts off the power supply from the control circuits P and thus causes the contacts of the cut-out relay in Ry2 to close again.

Output signals from the transformers T52, T54 are also fed to a low temperature detector circuit D3, which is arranged to feed a signal to the variable-ratio timer whenever the temperature of the heaters is below a predetermined level, as indicated by the size of current flowing in the connection to the heater. The low temperature detector circuit acts in a manner to be described to switch the heating system alternatively on and off to reduce the power supplied to the heaters when the resistance of the heater elements is low, on initial warming-up of the heaters.

The circuit D3 comprises rectifiers CR31 and CR32 connected to the current transformers T54 and T52 respectively and to a common connection 33 which supplies, through transistor Q30, a unidirectional current which charges capacitor C31 quickly to the peak value of the voltage from the current transformers. The voltage across C31 then causes C30 to charge through R50 until it reaches the predetermined level at which it discharges through the trigger circuit Q31, Q32, Q33 to operate the transistor switch unit TS. This causes the heaters to be switched off removing the voltage at connection 33, and the capacitor C30 then discharges through R50 and R51, as described above, for a predetermined time during which the heaters remain switched off. When C30 has discharged sufficiently the trigger circuit operates the transistor switch to restore the heater power, and the cycle is repeated.

The control circuits P also include an SCR protection circuit D4 which detects overheating of the SCR's and operates the transistor switch unit TS to cut off the power supply in this event. The circuit is operated by positive temperature coefficient thermistors TH1 and TH2 adjacent the SCR's and connected in a bridge circuit with resistors R53, R54, R55 to actuate transistor Q39 which feeds current to C30 whenever the balance of the bridge circuit is disturbed by any excessive rise in temperature of the SCR's, thus causing the power to be switched off.

Figure 9:
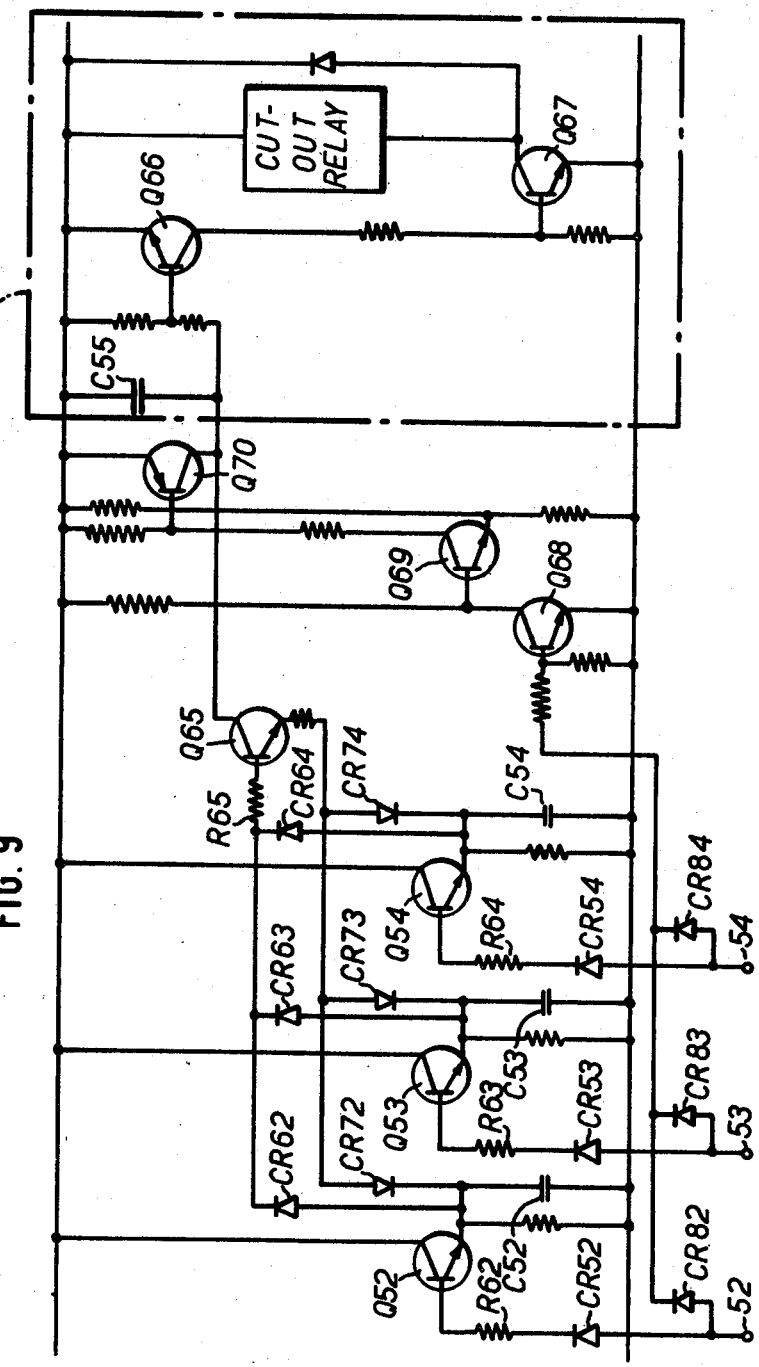

FIGURE 9 is a detail circuit diagram of the arcing detector circuit D5 shown schematically in FIGURE 7. The circuit D5 operates by comparing the three signals from the current transformers T52, T53, T54 and detecting any inequality in these signals which would indicate a drop in resistance of one or more heater elements due to arcing resulting from defective insulation.

The inputs 52, 53, 54 from the transformers T52, T53, T54 are fed to the bases of transistors Q52, Q53, Q54 respectively, via rectifiers CR52, CR53 and CR54 and resistors R62, R63, and R64 respectively. This causes capacitors C52, C53 and C54 to be charged to the peak voltages at the inputs 52, 53, 54 respectively.

Capacitors C52, C53 and C54 are all connected, through rectifiers CR62, CR63 and CR64 and resistors R65 to the base of a transistor Q65 the emitter of which is connected through rectifiers CR72, CR73 and CR74 to the capacitors C52, C53, C54, the rectifiers CR72, CR73, CR74 being connected in the opposite sense to the rectifiers CR62, CR63, CR64. Any appreciable difference in the input voltages therefore causes a current to flow in the base-emitter circuit of Q65, and an amplified current through the collector charges a capacitor C55 which drives a transistor Q66, which drives a transistor Q67 to operate the cut-out relay.

Although the present invention has been illustrated and described in connection with certain selected example embodiments, it will be understood that these are illustrative of the invention and are by no means restrictive thereof. It is reasonably to be expected that those skilled in this art can make numerous revisions and adaptations of the invention and such revisions and adaptations are intended to be included within the scope of the following claims as equivalents of the invention.

In order to prevent operation of the arcing detector circuit D5 when an imbalance due to one of the heater elements becoming open-circuit occurs, a chain of transistors Q68, Q69, Q70 is provided to discharge the capacitor C55 in this event. The transistor Q68 is fed in a similar manner to the transistor Q65 through rectifiers CR82, CR83 and CR84, and when one heater element becomes open-circuit the resulting large voltage drop at one of the points 52, 53, 54 causes the transistor Q68, which is normally conducting, to cease to conduct for a period in each current cycle. The transistor Q69 is switched on for a corresponding period, and the transistor Q70 is also switched on to discharge the capacitor C55 during that period, thus preventing the circuit from operating the cut-out relay.

The systems described above have the advantage that they provide a control of great sensitivity which enables the temperature of an aircraft de-icing element to be raised to a level which provides the most efficient de-icing effect possible without causing damage to the heating element. This is particularly important in the case of an element which is covered by a sheath of elastomeric material such as polychloroprene.

Having now described our invention, what we claim is:

1. A control circuit for an electrical heating system comprising a heating element having a resistance which varies with temperature and means including at least one silicon controlled rectifier for feeding electrical power to the heating element from an alternating current supply, transformer means for sensing a change in resistance of the heating element comprising a core, two primary windings and a secondary winding, the two primary windings being connected so as to produce opposing magnetic effects in the core, one primary winding being arranged to be connected in series with the heating element and the other primary winding being arranged to be connected in parallel with the heating element, a phase-sensitive gate circuit, the output of the secondary winding being fed to said phase-sensitive gate circuit together with a signal from the supply, the output of the gate circuit, produced when the input signals to the gate circuit are in phase, being arranged to trigger the silicon controlled rectifier so as to adjust the firing angle of the silicon controlled rectifier and thereby render it conducting for a controlled proportion of each half-cycle of the A.C. supply thus controlling the electrical power supplied to the heating element and preventing the temperature of the heating element rising above a predetermined level.

2. A system according to claim 1 in which the secondary winding is connected to the base of a transistor and through a rectifier to the emitter of the transistor, the alternating current supply being connected through a rectifier to the collector of the transistor, and the collector current being arranged to charge a capacitor which is connected in a silicon controlled rectifier trigger circuit in a manner such that the charging rate of the capacitor controls the firing angle of the silicon controlled rectifier.

3. A control system according to claim 1 comprising two silicon controlled rectifiers arranged to provide a full wave controlled alternating supply to the heating element, the opposite ends of the secondary winding of the transformer being connected to two similar control means one for each silicon controlled rectifier.

4. A control system according to claim 1 wherein three silicon controlled rectifiers are provided for feeding electrical power to three heating elements from a three-phase alternating current supply, one silicon controlled rectifier and its associated control means being provided for each heating element and one heating element being associated with means for sensing a change in the resistance of the element and connected to the control means for all three silicon controlled rectifiers, at least one rectifier being provided in parallel with each of the silicon controlled rectifiers to provide a return path for current from the other silicon controlled rectifiers.

5. A system according to claim 1 comprising an overheat protection circuit including a second phase-sensitive gate circuit to which the output from the secondary winding of the transformer is fed, together with a signal from the supply, the second phase-sensitive gate circuit producing an output signal when the input signals are in phase to operate a relay arranged to cause the power supply to be cut off from the heating element when the said output signal exceeds a predetermined level.

6. A system according to claim 1 wherein the control means incorporates means for switching off the supply of power to the heater element for a predetermined time whenever the temperature of the heater element rises above a predetermined level.

7. A system according to claim 6 wherein the means for switching off the supply of power to the heater element comprises a variable-ratio timer arranged to receive from a temperature sensing circuit a series of unidirectional current pulses the amplitude of which is proportional to the excess of the temperature of the heater element over the required level, the variable-ratio timer comprising a timer capacitor which is arranged to be charged by the said current pulses and to discharge through a trigger circuit when it is charged to a predetermined level, the trigger circuit being arranged during the period when discharge of the capacitor is occurring to operate a transistor switch unit to cut off the supply to a control circuit of the silicon controlled rectifier and thereby to prevent current from flowing to the heater element, the rate of discharge of the capacitor through resistors contained in the trigger circuit being predetermined so as to cause the heater supplies to be switched off for a predetermined time.

8. A system according to claim 7 wherein a low-temperature detector circuit is provided to feed a signal to the variable-ratio timer whenever the temperature of the heater element is below a predetermined level, the low-temperature detector circuit comprising a capacitor arranged to be charged to a voltage proportional to the peak value of the current supplied to the heater element and arranged to charge the timer capacitor at a predetermined rate, the arrangement being such that when the timer capacitor discharges it switches off the power to the heater element and also causes the capacitor associated with the low-temperature detector circuit to be discharged, further interrupted heating cycles following until the heater element has reached a predetermined temperature.

9. A system according to claim 7 wherein three heater elements are arranged to be supplied with power from a three-phase supply and comprising an arcing detector circuit in which signals coresponding to the currents flowing in the three heater elements are compared with one another and which is arranged to respond to any inequality between the three signals so as to cut off the power supply to the heater elements.

10. A system according to claim 9 wherein the arcing detector circuit comprises three capacitors arranged to be charged through rectifiers to voltages corresponding to the respective peak values of current in the three heater elements and each connected through a pair of rectifiers of opposite polarity to the respective input terminals of an amplifier arranged to operate a cut-out relay whenever any appreciable difference in the three signals arises.

11. A system according to claim 10 wherein means is provided to prevent operation of the arcing detector circuit as a result of an imbalance in the three signals arising from one of the heater elements becoming open-circuit, comprising an amplifier arranged to be fed with the rectified signals corresponding to the currents flowing in the heater elements and operating during any period when a signal disappears to prevent operation of the cut-out relay.

12. A control circuit for an electrical heating system comprising a heating element having a control resistance section with a different coefficient of change of resistance with temperature relative to the coefficient of change of resistance with temperature of the remainder of said heating element and means including at least on silicon controlled rectifier for feeding electrical power to the heating element from an alternating current supply, transformer means for sensing a change in resistance of the heating element comprising a core, two primary windings and a secondary winding, the two primary windings being connected so as to produce opposing magnetic effects in the core, one primary winding being arranged to be connected in series with the heating element and the other primary winding being arranged to be connected in parallel with the heating element, a phase-sensitive gate circuit, the output of the secondary winding being fed to said phase-sensitive gate circuit together with a signal from the supply, the output of the gate circuit, produced when the input signals to the gate circuit are in phase, being arranged to trigger the silicon controlled rectifier so as to adjust the firing angle of the silicon controlled rectifier and thereby render it conducting for a controlled proportion of each half-cycle of the A.C. supply thus controlling the electrical power supplied to the heating element and preventing the temperature of the heating element rising above a predetermined level.

References Cited

UNITED STATES PATENTS

| 3,254,838 | 6/1966 | Chambers | 219—501 |
| 3,369,108 | 2/1968 | Strachan | 219—501 |

FOREIGN PATENTS

| 892,825 | 3/1962 | Great Britain. |

GEORGE HARRIS, Primary Examiner

F. E. BELL, Assistant Examiner